United States Patent
Koh et al.

(10) Patent No.: US 9,189,165 B2
(45) Date of Patent: Nov. 17, 2015

(54) METHOD AND APPARATUS FOR MEMORY MANAGEMENT

(71) Applicant: Electronics and Telecommunications Research Institute, Daejeon (KR)

(72) Inventors: Kwang-Won Koh, Daejeon (KR); Kang Ho Kim, Daejeon (KR); Seung Hyub Jeon, Daejeon (KR); Seungjo Bae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 308 days.

(21) Appl. No.: 13/942,328

(22) Filed: Jul. 15, 2013

(65) Prior Publication Data

US 2014/0310497 A1     Oct. 16, 2014

(30) Foreign Application Priority Data

Apr. 10, 2013 (KR) .................. 10-2013-0039007

(51) Int. Cl.
*G06F 3/06* (2006.01)
*G06F 9/50* (2006.01)
*G06F 12/00* (2006.01)

(52) U.S. Cl.
CPC ............ *G06F 3/0631* (2013.01); *G06F 3/0607* (2013.01); *G06F 3/0683* (2013.01); *G06F 9/5016* (2013.01); *G06F 12/00* (2013.01)

(58) Field of Classification Search
CPC ... G06F 3/0631; G06F 3/0607; G06F 3/0683; G06F 9/5016; G06F 12/00; G06F 3/06
USPC .......................... 711/170, 154, 156, 200, 203
See application file for complete search history.

(56) References Cited

U.S. PATENT DOCUMENTS

| | | | | |
|---|---|---|---|---|
| 5,860,141 A | * | 1/1999 | Washington et al. | 711/202 |
| 6,128,713 A | * | 10/2000 | Eisler et al. | 711/159 |
| 7,000,087 B2 | * | 2/2006 | Atherton et al. | 711/170 |
| 7,213,125 B2 | * | 5/2007 | de Dinechin et al. | 711/203 |
| 2005/0273570 A1 | * | 12/2005 | DeSouter et al. | 711/203 |
| 2010/0115226 A1 | * | 5/2010 | Ueno | 711/173 |

FOREIGN PATENT DOCUMENTS

KR    10-2011-0115759    10/2011

OTHER PUBLICATIONS

Andrea Arcangeli, et al., "Increasing memory density by using KSM", Proceedings of the Linus Symposium 2009, pp. 19-28, Jul. 16, 2009.

\* cited by examiner

*Primary Examiner* — Stephen Elmore
(74) *Attorney, Agent, or Firm* — Kile Park Reed & Houtteman PLLC

(57) ABSTRACT

A method for memory management, include allocating an empty page of a physical memory for reference data according to execution of an application program, and mapping the empty page to a virtual memory; checking a physical address of the physical memory to which the reference data has been loaded; mapping the checked physical address to the virtual memory to which the empty page has been mapped, and mapping the reference data; and releasing allocation of the allocated physical memory when the reference data is mapped to the virtual memory.

4 Claims, 5 Drawing Sheets

METHOD AND APPARATUS FOR MEMORY MANAGEMENT

Related Applications

This application claims the benefit of Korean Patent Application No. 10-2013-0039007, filed on Apr. 10, 2013, which is hereby incorporated by reference as if fully set forth herein.

FIELD OF THE INVENTION

The present invention relates to a method and an apparatus for memory management, and more particularly to a method and an apparatus for memory management, which reduce a requirement memory for high integration execution of a biological information study application.

BACKGROUND OF THE INVENTION

In a biological information study field, arithmetic calculations related to a sequence and the like of DNA, RNA, or protein are performed based on reference data. Such arithmetic calculations include target alignment and the like for checking an area having similarity in a functional, structural, and developmental relation between sequences, and several hundreds of MB to several TB of target data needs to be processed for one object according to the application thereof.

To the end, in a conventional art, when a typical memory management method is applied to a general purpose computer having a Von Neumann architecture, since characteristics of an application in which proximity data is classified into reference data and target data are not recognized, several tens of MB/s to several hundreds of MB/s of data input/output (IO) bandwidths are additionally required. The reference data indicates data with a size of about 3 GB to about 50 GB commonly used by a plurality of applications, and the target data indicates data with a size of about 70 GB to about 200 GB, which is to be subject to information processing.

Furthermore, when a plurality of corresponding applications are executed for one computer node, since it is not recognized that reference data is the same data dedicated for reading and a separate memory is allocated, a high memory cost is required. Furthermore, due to inefficient data management, an inefficient arithmetic calculation of a processor as well as a memory is performed.

For example, on the basis of reference data based on a character string indicating a nucleotide sequence or peptide sequence, applications for detecting SNP (Single-nucleotide polymorphism) of a target biological sequence perform a plurality of steps through pipe lines. In the implementation of all pipelines, data of about 780 GB is read and data of about 800 GB is generated. At this time, when a plurality of applications are executed, it is possible to reduce a time required to analyze all the pipelines by using data parallelism of a process level to the extent that pipeline dependency is not violated.

SUMMARY OF THE INVENTION

However, when reducing the time by using the parallelism as described above, since applications do not distinguish the reference data from the target data at the time of analysis of dielectric data, large requirements for input/output may occur by thrashing for the reference data with respect to a system having a low memory against a high memory requirement.

On the other hand, a KSM (Kernel Shared Memory or Kernel Samepage Merging) technique added in the Linux Kernel supports sharing for a memory page frame having the same content used in a system. However, since this applies an algorithm for finding the same page frames throughout the system and merging them, it is not possible to support sharing for a memory in an initial execution step of an application. As a consequence, when a high memory requirement is satisfied in an initial execution step of a program and an application program reaches a stabilization step, the same contents are merged such that the memory of the system is efficiently used. However, in a system having an insufficient memory, when a memory requirement required in the initial execution of the application program is not satisfied, it is not possible to execute the corresponding application. Furthermore, a kernel program performing comparison/merging continuously operates, resulting in the deterioration of performance.

In view of the above, the present invention provides a method and an apparatus for memory management, which reduce a requirement memory for high integration execution of a biological information study application.

In accordance with the embodiment of the present invention, in the case in which various parallelism works of a process level are performed for an application that analyzes target data based on reference data, overlapping of reference data required when the application is initially executed is prevented and input/output generated when the reference data is discarded from a memory cache by the use of the target data is prevented. Consequently, it is possible to support that an analysis application efficiently uses a system, resulting in an increase in an arithmetic calculation amount per unit time.

In accordance with a first aspect of the exemplary embodiment of the present invention, there is provided a method for memory management, includes: allocating an empty page of a physical memory for reference data according to execution of an application program, and mapping the empty page to a virtual memory; checking a physical address of the physical memory to which the reference data has been loaded; mapping the checked physical address to the virtual memory to which the empty page has been mapped, and mapping the reference data; and releasing allocation of the allocated physical memory when the reference data is mapped to the virtual memory.

In the exemplary embodiment, the method further includes in the allocating of the physical memory, when all physical memories are in use, an address space, which has a relatively smallest number of address spaces mapped to the virtual memory, among all address spaces is selected as a victim frame.

In accordance with a second aspect of the exemplary embodiment of the present invention, there is provided an apparatus for memory management, includes: a memory allocation unit for allocating an empty page of a physical memory for reference data according to execution of an application program, and mapping the empty page to a virtual memory; a reference data management unit for checking a physical address of the physical memory to which the reference data has been loaded, mapping the checked physical address to the virtual memory to which the empty page has been mapped, and mapping the reference data; and a memory release unit for releasing allocation of the physical memory allocated by the memory allocation unit when the reference data is mapped to the virtual memory.

In the exemplary embodiment, the apparatus further includes the memory allocation unit selects an address space, which has a relatively smallest number of address spaces mapped to the virtual memory, among all address spaces as a victim frame when all physical memories are in use.

BRIEF DESCRIPTION OF THE DRAWINGS

The objects and qualities of the present invention will become apparent from the following description of embodiments given in conjunction with the accompanying drawings, in which.

DETAILED DESCRIPTION OF THE EMBODIMENTS

Figure 1:
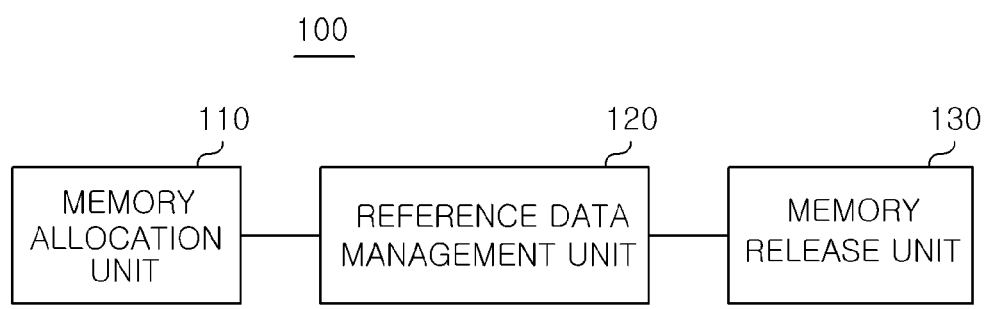
FIG. 1 is a block diagram illustrating the configuration of an apparatus for memory management according to an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, embodiments of the present invention will be described in detail with reference to the accompanying drawings.

FIG. 1 is a block diagram illustrating the configuration of an apparatus for memory management according to an embodiment of the present invention.

As illustrated in FIG. 1, an apparatus 100 for memory management includes a memory allocation unit 110, a reference data management unit 120, and a memory release unit 130.

The memory allocation unit 110 allocates an empty page of a physical memory for reference data according to the execution of an application program, and maps the empty page to a virtual memory. Such a memory allocation unit 110 selects an address space, which has the relatively smallest number of address spaces mapped to the virtual memory, among all address spaces as a victim frame when all physical memories are in use.

The reference data management unit 120 checks a physical address of a physical memory including the reference data required for the execution of the application program when the reference data has already been loaded in the physical memory, maps the checked physical address to the virtual memory to which the empty page has been mapped, and maps the reference data.

The memory release unit 130 releases the allocation of the physical memory allocated by the memory allocation unit 110 when the reference data is mapped to the virtual memory.

Figure 2:
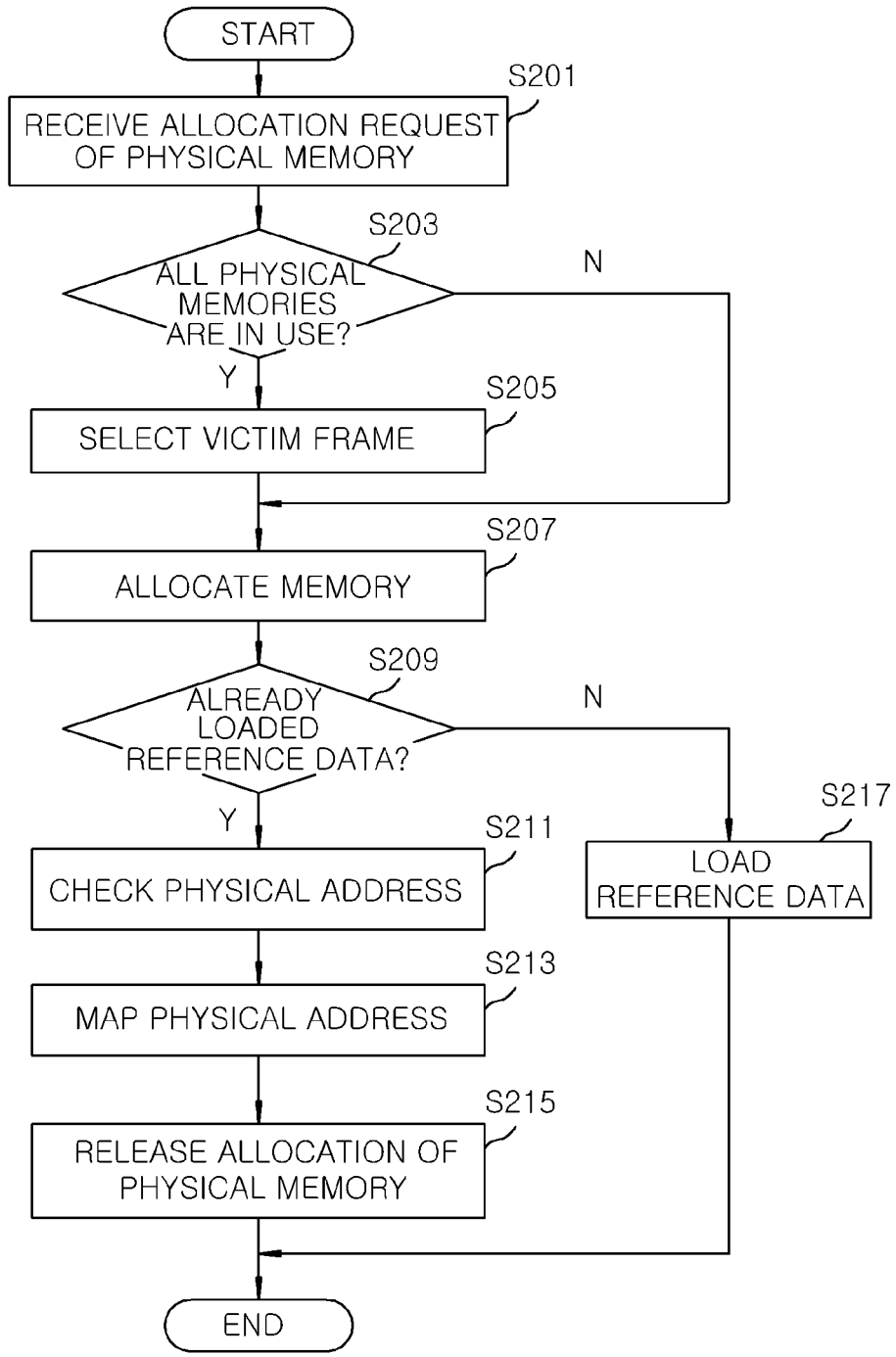
FIG. 2 is a flowchart for explaining a method for memory management according to an embodiment of the present invention.

FIG. 2 is a flowchart for explaining a method for memory management according to the embodiment of the present invention.

As illustrated in FIG. 2, the method for memory management includes a step (S201) of receiving an allocation request of the physical memory according to the execution of an application program, steps (S203 and S205) of selecting an address space, which has the relatively smallest number of address spaces mapped to the virtual memory, among all address spaces as the victim frame when all physical memories are in use, a step (S207) of allocating an empty page of the physical memory for the reference data and mapping the empty page to the virtual memory, steps (S209 and S211) of checking a physical address of the physical memory including the reference data required for the execution of the application program when the reference data has already been loaded in the physical memory, a step (S213) of mapping the checked physical address to the virtual memory to which the empty page has been mapped and mapping the reference data, a step (S215) of releasing the allocation of the allocated physical memory when the reference data is mapped to the virtual memory, and a step (S217) of loading corresponding reference data when the reference data required for the execution of the application program has not already been loaded in the physical memory.

Hereinafter, with reference to FIG. 1 to FIG. 5, a memory management process performed by the apparatus for memory management according to the embodiment of the present invention will be described in detail.

The apparatus 100 for memory management according to the embodiment of the present invention increases an arithmetic calculation amount per unit time through dualistic management of reference data and target data and sharing of the reference data without recognition of an application with respect to the application that performs an arithmetic calculation based on the reference data. To this end, the reference data management unit 120 of the apparatus 100 for memory management operates through a file system interface of an operating system, prevents the same reference data from being overlappingly loaded in a memory with respect to a plurality of application programs, and provides illusion that each of the plurality of application programs directly loads one piece of reference data and uses the data.

Figure 3:
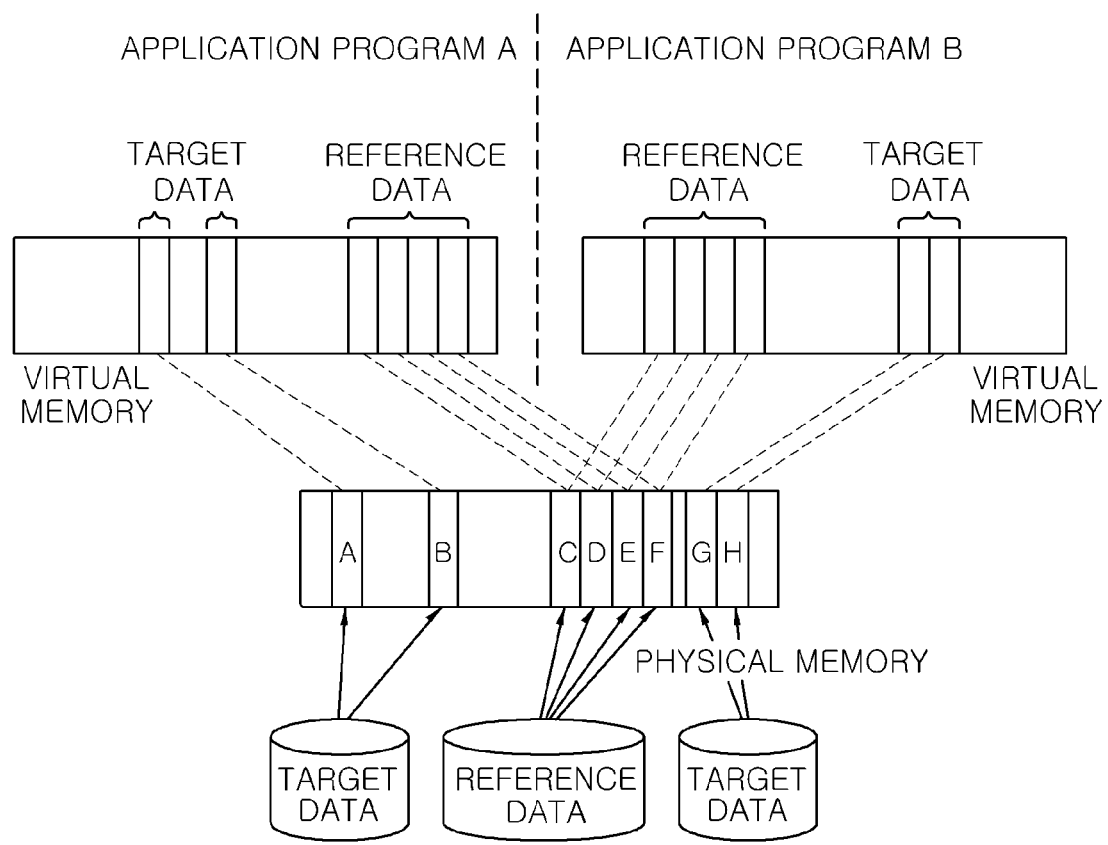
FIG. 3 is a diagram illustrating a memory mapping relation of an application program by an apparatus for memory management according to an embodiment of the present invention.
Figure 4:
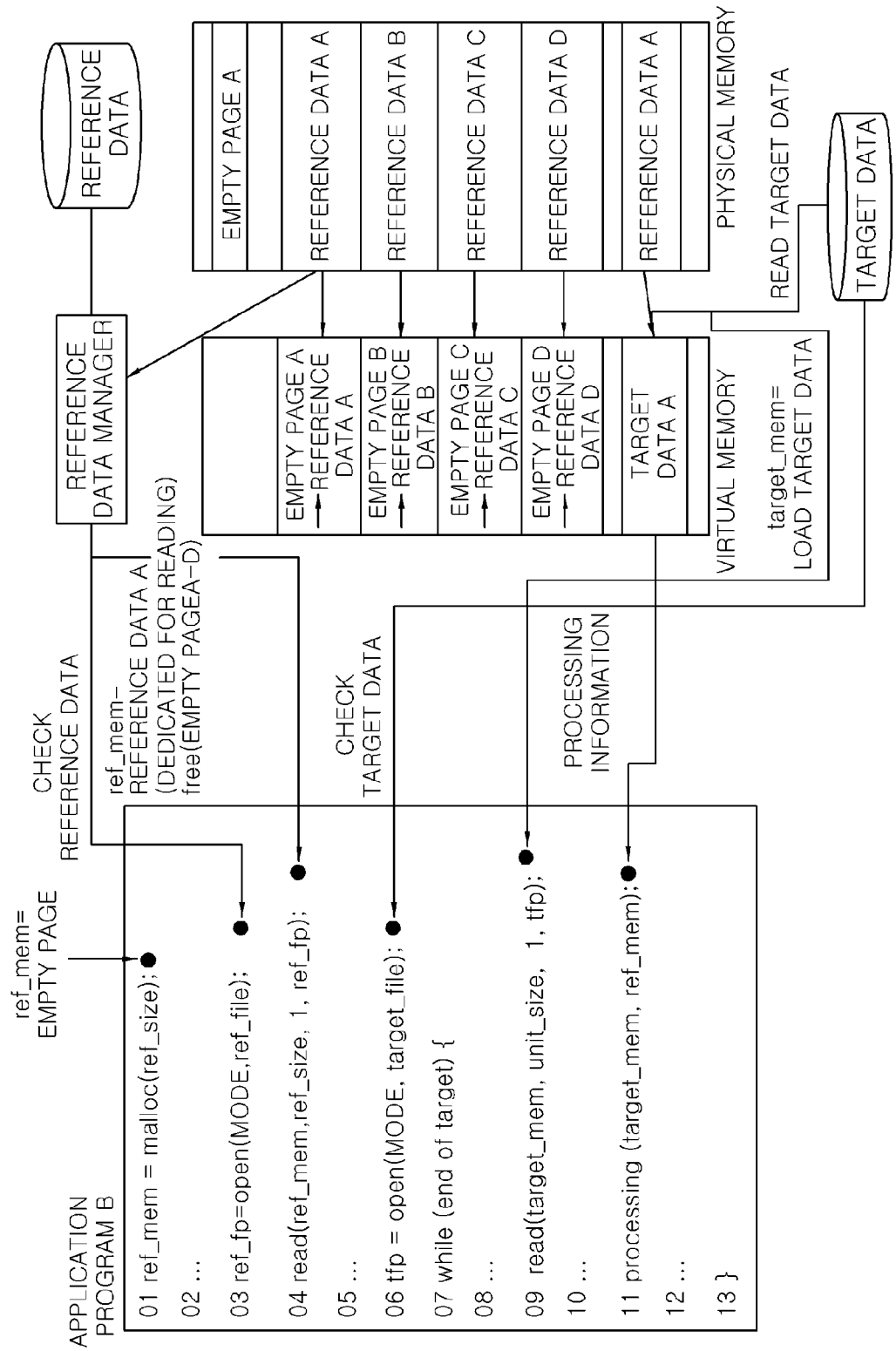
FIG. 4 is a diagram for explaining an execution process of an application program by a method for memory management according to an embodiment of the present invention.

FIG. 3 is a diagram illustrating a memory mapping relation of an application program by the apparatus 100 for memory management according to the embodiment of the present invention. FIG. 4 is a diagram for explaining an execution process of an application program by the method for memory management according to the embodiment of the present invention, and illustrates a memory allocation order when an application program B is executed in the state in which an application program A is being executed.

Figure 5:
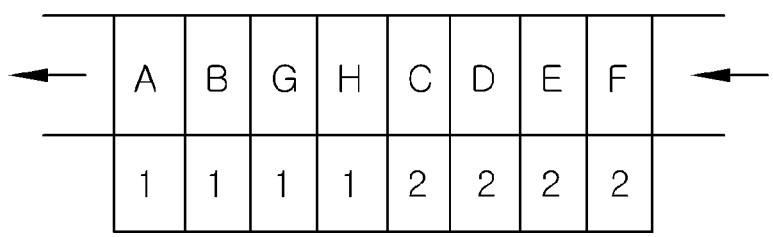
FIG. 5 is a diagram illustrating a priority queue that is used when a victim frame is selected according to an embodiment of the present invention.

When the allocation of the physical memory is requested according to the execution of the application program B (S201), the memory allocation unit 110 checks whether all physical memories are in use (S203), and selects an address space, which has the relatively smallest number of address spaces mapped to the virtual memory, among all address spaces as the victim frame when all the physical memories are in use (S205). To this end, as illustrated in FIG. 5, priority queues aligned on the basis of the number of address spaces mapped to the virtual memory with respect to all address spaces at the present time are used. Accordingly, a page frame with a low priority is first selected as the victim frame.

Next, the memory allocation unit 110 allocates an empty page A to an empty page D of the physical page in order to use the reference data in code 01 of the application program B, and maps the empty page A to the empty page D to the virtual memory (S207).

Then, when the memory allocation unit 110 calls an open function of the reference data management unit 120 in code 03 of the application program B, the reference data management unit 120 checks whether reference data required by the application program B has already been loaded in the physical memory (S209).

When the reference data required by the application program B has already been loaded in the physical memory, the reference data management unit 120 maps (S213) the checked (S211) physical address to the virtual memory to which the empty page A to the empty page D have been mapped in step S207, and maps reference data A to reference data D. That is, when the memory allocation unit 110 calls a read function of the reference data management unit 120 in code of the application program B, the reference data management unit 120 maps a physical address of reference data loaded by the execution of the application program A to an address space including the empty page A allocated in the code 01, and maps the reference data A to the reference data D to the virtual memory space to which the empty page A to the empty page D have been mapped.

When the reference data A to the reference data D are mapped to the virtual memory, the memory release unit 130 releases the allocation of the empty page A to the empty page D of the physical memory allocated by the memory allocation unit 110 in step S207 (S215).

If the reference data required for the execution of the application program B has not already been loaded in the physical memory, the required corresponding reference data is loaded in the empty page A to the empty page D of the physical memory (S217).

Then, in code 06 to code 13 of the application program B, target data is opened, is loaded in the physical memory, and is subject to information processing based on the reference data.

According to the method for memory management by the apparatus 100 for memory management of the present invention as described above, in the case in which the application program A and the application program B using the same reference data exist in one node, when required reference data and target data are read from a storage device (for example, a hard disk drive) and are loaded in the physical memory, there is no duplication in the entire area of the system as illustrated in FIG. 3.

In this way, the memory is efficiently used through the sharing of target data having low reusability and reference data having high reusability and the application of a victim priority, so that a memory requirement is reduced and a bandwidth required by input/output of the reference data is reduced.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for memory management, comprising:
   allocating an empty page of a physical memory for reference data according to execution of an application program, and mapping the empty page to a virtual memory;
   checking a physical address of the physical memory to which the reference data has been loaded;
   mapping the checked physical address to the virtual memory to which the empty page has been mapped, and mapping the reference data; and
   releasing allocation of the allocated physical memory when the reference data is mapped to the virtual memory.

2. The method of claim 1, wherein, in the allocating of the physical memory, when all physical memories are in use, an address space, which has a relatively smallest number of address spaces mapped to the virtual memory, among all address spaces is selected as a victim frame.

3. An apparatus for memory management, comprising:
   a memory allocation unit for allocating an empty page of a physical memory for reference data according to execution of an application program, and mapping the empty page to a virtual memory;
   a reference data management unit for checking a physical address of the physical memory to which the reference data has been loaded, mapping the checked physical address to the virtual memory to which the empty page has been mapped, and mapping the reference data; and
   a memory release unit for releasing allocation of the physical memory allocated by the memory allocation unit when the reference data is mapped to the virtual memory.

4. The apparatus of claim 3, wherein the memory allocation unit selects an address space, which has a relatively smallest number of address spaces mapped to the virtual memory, among all address spaces as a victim frame when all physical memories are in use.

* * * * *